United States Patent
Schultz et al.

(10) Patent No.: US 6,246,962 B1
(45) Date of Patent: Jun. 12, 2001

(54) METHOD AND APPARATUS FOR ADAPTIVELY FILTERING NOISE TO DETECT DOWNHOLE EVENTS

(75) Inventors: Roger L. Schultz; John D. Burleson, both of Denton, TX (US)

(73) Assignee: Halliburton Energy Services, Inc., Dallas, TX (US)

( * ) Notice: Subject to any disclaimer, the term of this patent is extended or adjusted under 35 U.S.C. 154(b) by 0 days.

(21) Appl. No.: 09/322,267

(22) Filed: May 28, 1999

(51) Int. Cl.$^7$ ........................................... G01V 1/40
(52) U.S. Cl. ................................. 702/6; 702/17
(58) Field of Search ................... 702/6, 14, 16, 702/17; 307/73; 324/338

(56) References Cited

U.S. PATENT DOCUMENTS

| | | | | |
|---|---|---|---|---|
| 5,339,036 | * | 8/1994 | Clark | 324/338 |
| 5,576,703 | * | 11/1996 | MacLeod et al. | 340/854.4 |
| 5,694,474 | * | 12/1997 | Ngo et al. | 381/66 |
| 5,941,307 | * | 8/1999 | Tubel | 166/313 |

* cited by examiner

*Primary Examiner*—Jay Patidar
*Assistant Examiner*—Victor J. Taylor
(74) *Attorney, Agent, or Firm*—Paul I. Herman; David W. Carstens

(57) ABSTRACT

Adaptive neural networks can be used to effectively enhance signal detection in the inherently noisy environment of an oil well. The neural network can be either non-recurrent or recurrent in nature. The system is implemented with a computer that accepts input from at least one sensor mounted to the wellhead or near the wellhead. The detected contaminated signal is a combination of the event signal and the noise from the environment. The event signal can be, for example, the detonation of a perforation gun. The noise can be either random or periodic. The use of adaptive filtering allows the noise to be more precisely predicted and then subtracted from the contaminated signal to produce a cleaner representation of the event signal. Once the predicted noise is subtracted, the remaining event signal can be analyzed using voice or sound recognition systems to produce an output describing what event occurred.

32 Claims, 6 Drawing Sheets

METHOD AND APPARATUS FOR ADAPTIVELY FILTERING NOISE TO DETECT DOWNHOLE EVENTS

BACKGROUND OF THE INVENTION

1. Technical Field

The present invention relates to an improved method and apparatus for filtering noise to detect downhole events. More specifically, the invention utilizes a neural-network based filtering system to detect faint signals from within a noisy environment such as an oil well.

2. Description of the Related Art

It is important to know if a perforation gun has detonated completely, partially, or not at all. However, this can be difficult to know with absolute certainty when the gun has been lowered several thousand feet into an oil well. The fluid in the well can dampen the vibration from the detonation. The sound from the detonation can be detected and amplified. However, the amplified signal can still be undecipherable because it is intermixed with the random and periodic noises produced around the well. Noise sources can include engines and pumps, the sound of fluid passing through pipes, and the impact of metal tools on pipes. A need exists for an improved method of filtering the noise from the signal so that the undetonated or partially detonated gun is safely handled.

In addition to perforation guns, it is also desirable to monitor many downhole events, such as the actuation of a device, the latching of two interconnecting devices, or the breaking of shear pins. In each case, a distinctive sound or signal will be produced. But, detecting this signal will be hampered by the inherent noise of the environment. And while the examples given so far involve detection of the signal at the surface of a downhole event, the need may be reversed so that an intelligent downhole device can adequately detect a signal initiated at the surface.

A need exists for an improved method of filtering the noise from the desired signal. Such a method should include an adaptive method of correcting the error from earlier filtering efforts, in essence tuning itself to the needs of the particular well and surface environments.

SUMMARY

The present invention relates to a method of applying adaptive filtering methods for the purpose of improving the detection of event signals in in an oil well environment. Event signals can include, but not be limited to, sound, vibrations, electromagnetic energy, and pressure fluctuations. The use of adaptive filtering allows the user to both amplify desirable signals and remove unwanted contaminating signals, which tend to "mask" the desirable signals. The method can be implemented in an apparatus that uses real-time adaptive neural network filtering to enhance the detection of an event signal such as a subsurface explosive detonation in an oil well.

Adaptive neural networks can be used to effectively enhance signal detection in the inherently noisy environment of an oil well. The neural network can be either non-recurrent or recurrent in nature. The system is implemented with a computer that accepts input from at least one sensor mounted to the wellhead or near the wellhead. The detected contaminated signal is a combination of the event signal and the noise from the environment. The event signal can be, for example, the detonation of a perforation gun. The noise can be either random or periodic. The use of adaptive filtering allows the noise to be more precisely predicted and then subtracted from the contaminated signal to produce a cleaner representation of the event signal. Once the predicted noise is subtracted, the remaining representation of the event signal can be analyzed using voice or sound recognition to produce an output describing what event occurred.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE DRAWINGS

Figure 1:
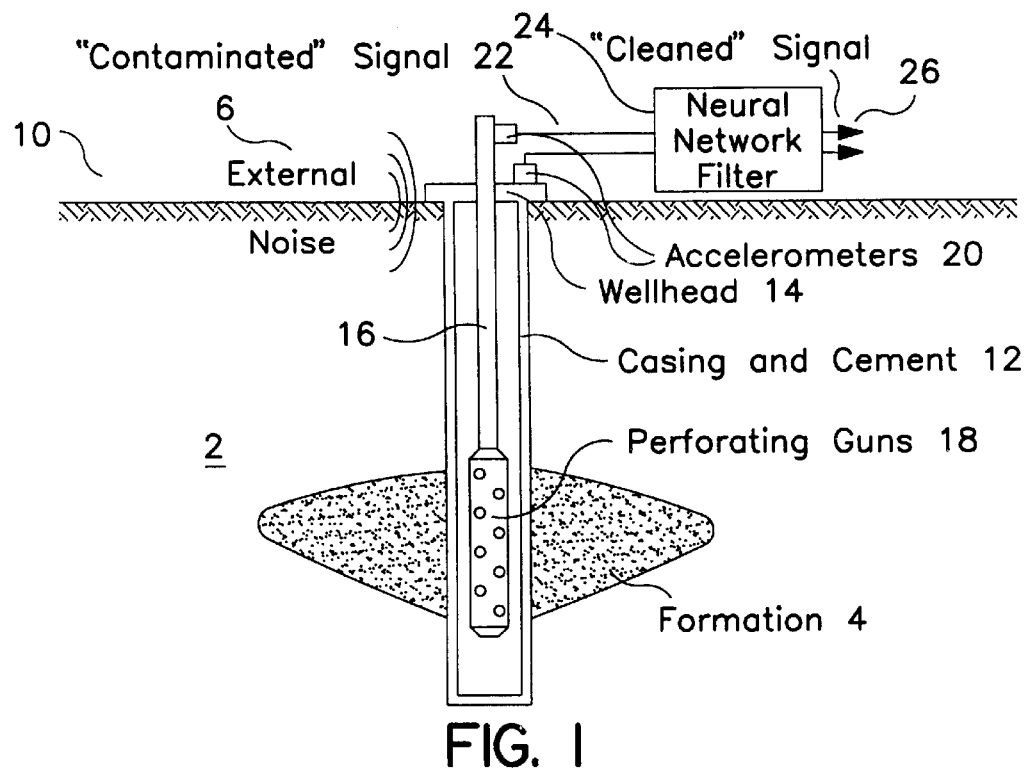
FIG. 1 is an example of an adaptive neural network filter as applied to an oil well environment.

FIG. 1 illustrates the environment of the present invention. An oil well 10 consists of drilling a wellbore into the earth 2, then placing a steel tubular casing 12 into the wellbore and cementing the casing into place. To allow production of hydrocarbons into the interior bore of the casing of an oil well, a perforation gun 18 made up of a series of shaped explosive charges is suspended in the wellbore by a tubing string 16 at a subsurface location where the oil well intersects an oil-bearing formation 4. The explosives are then detonated to perforate the casing, cement and formation. For safety reasons it is important to know with a high degree of confidence that the downhole explosives have successfully been detonated before the spent explosive apparatus is retrieved from the well. If the charges successfully detonated, the formation should produce increased volumes of fluid. However, if the well's production does not improve, the operator cannot assume that the charges failed to detonate. After all, the perforation gun might have been at an incorrect depth, or the formation was simply a "dry hole." In other words, an analysis of the well's performance cannot safely be used as a secondary indicator of a successful detonation.

For sufficiently shallow detonations, the physical vibration can be felt by hand on the wellhead 14. As the depth of the detonation increases, an accelerometer 20 can be attached to the wellhead 14 to detect the acoustic shock wave generated by the explosion. The surface location around an oil well is generally quite noisy, often severely contaminating the accelerometer signal making it difficult to detect explosives detonation below the surface. This signal is often very weak, and can easily be masked by surface noises generated by pumps, generators and other equipment. The contaminating noise is generally repetitive in nature, such as the cyclic sound of a pump. The signals generated by explosives tend to be impulsive in nature. Together, the signal and noise produce a contaminated signal 22 that is detected by the accelerometer. The contaminated signal is acted on by the adaptive filter 24 to produce a cleaner signal 26. The cleaner signal can then be acted on by speech recognition software to correlate the cleaner signal to a specific event such as the detonation of a perforation gun. The adaptive filter can be implemented as a digital signal processor used in conjunction with a computer.

The present invention is not limited to the detection of sound. The adaptive filtering methods described can be used on any digitized event signal. The signal being measured can be sound, vibration, electromagnetic energy, pressure and so forth. The detector means used can vary according the nature of the signal of interest. For example, the detector means could be a pressure sensor, a hydrophone, a geophone, and antenna, or a transducer. The output from the detector means can be digitized and then acted upon in accordance with the present method. Once a cleaned representation of the event signal is produced, it can be displayed on an output device such as a monitor, a CRT, a strip chart recorder, an audio speaker, or simply stored into a memory.

Figure 2:
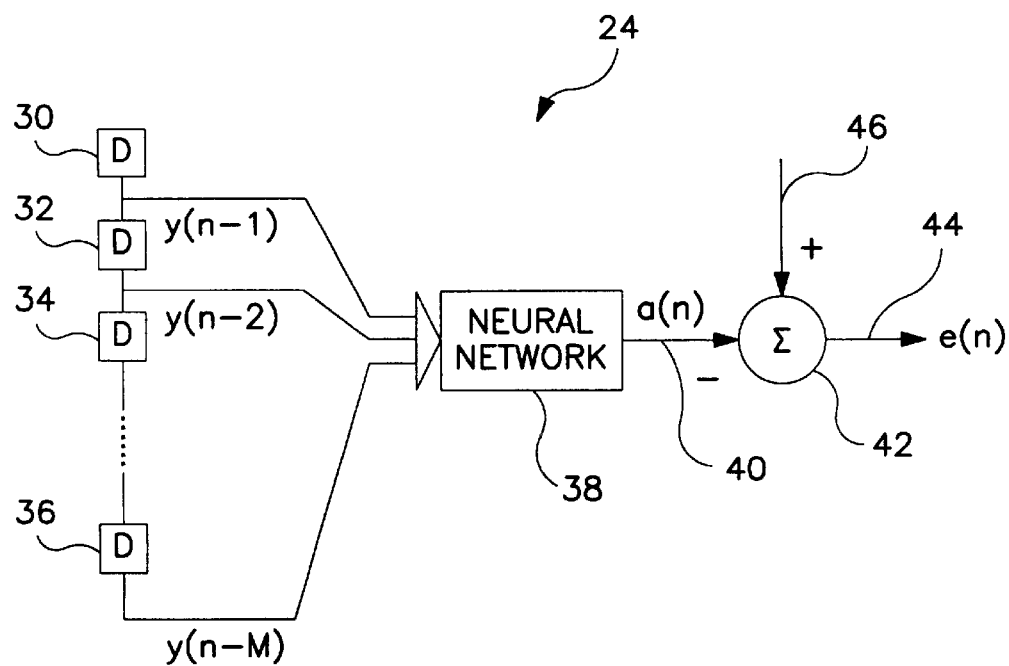
FIG. 2 illustrates a non-recurrent real-time neural network.

Referring to FIG. 2, an adaptive neural network filter 24 is shown. The network filter uses multiple inputs taken at successive times to produce an output. The first input 36 is taken at a first time, successive inputs 32, 34 are taken at later times. These values are combined with a current input signal 30. The neural network filter 38 analyzes these multiple inputs and mathematically estimates an output 40, a(n). For example, the output could be represented as a function of the input and various network weights:

$$a(n)=F(y(n-1), y(n-2) \ldots y(n-N), W1, W2, \ldots W_N)$$

The predicted value a(n) is subtracted from the next measured sample to produce an error function 44, e(n). The goal of the adaptive filter is to adjust the coefficients, or neural network weights, of the predictive function shown above so that $e(n)^2$ approaches zero.

The prediction error is used with one of several methods such as the gradient decent method to update or adjust the neural network weights. The prediction error signal will then tend to contain random and impulsive noises. In this way an adaptive, predictive, non-linear, neural network filter is used to filter away repetitive undesirable noises, leaving only the desirable impulsive components, which include the signal, generated by a subsurface explosion.

Network training can be accomplished using an approximate steepest descent method. At each time step the measured error is used to calculate a local gradient estimation which is used to update the network weights. This concept was introduced by Widrow and Hoff when they first described the LMS algorithm. A person having ordinary skill in the art of adaptive filtering will understand the various algorithms that can be used to adjust the network weights to minimize the value of $e(n)^2$.

Figure 3:
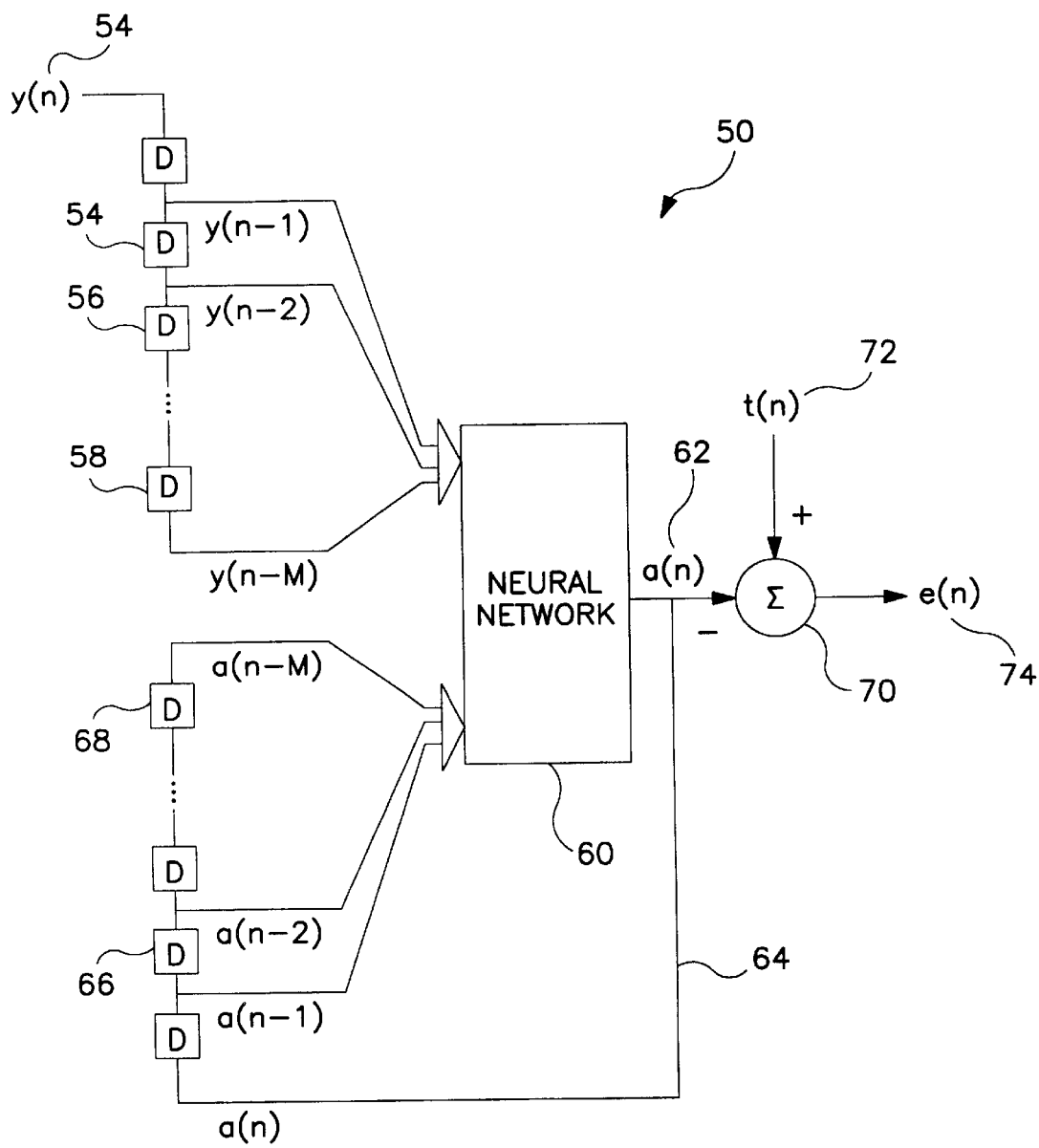
FIG. 3 illustrates a recurrent real-time neural network.

In contrast to the non-recurrent networks described above, a recurrent network utilizes a feedback loop from the output to help train the network. FIG. 3 illustrates an example of a recurrent neural network 50. A plurality of input samples 52, 54, 56, and 58 are entered into the recurrent neural network 60, producing an output 62, a(n). The output changes with the constantly changing input. A sampling of the output is fed back into the neural network 60. The output a(n) is then calculated as a function of both the input and the previous output feedback data. For example, the output is a function of a sample of input values, output values and network weights:

$$a(n)=F(y(n-1), y(n-2) \ldots y(n-N), a(n-1), a(n-2) \ldots a(n-N), W_1, W_2 \ldots W_N)$$

Again, the goal is to adjust the network weights in the equation to minimize the difference between the predicted output and the actual input. Various methods are known for quickly closing on the optimum weights. For example, a cost function gradient can be used to approximate the steepest descent method of training. For networks which are non-recurrent (i.e., having no feedback), standard back propagation may be used to calculate the necessary gradient terms used in training.

The error e(n) is the difference between the desired network ouptut, and the actual network output. In a predictive signal processing system the prediction error is calculated as the difference between the measured signal sample, and it's previously computed prediction. These computed errors are used to adjust the neural network weights to minimize the signal prediction error. For recurrent networks in which delayed values of the output are fed back as input to the network, a different method of calculating the derivative of the network output with respect to the weights must be used. This is necessary because when a feedback path is present the current output is always a function of the past output. A method of dynamic back propagation described by Yang and Hagan can be used to calculate the gradient for use in weight adjustment. However, it is important to understand that many methods can be used to mathematically optimize these systems. A person having ordinary skill in the art will appreciate this fact and could choose any of such methods and still operate within the spirit and claims of this invention.

Figure 4:
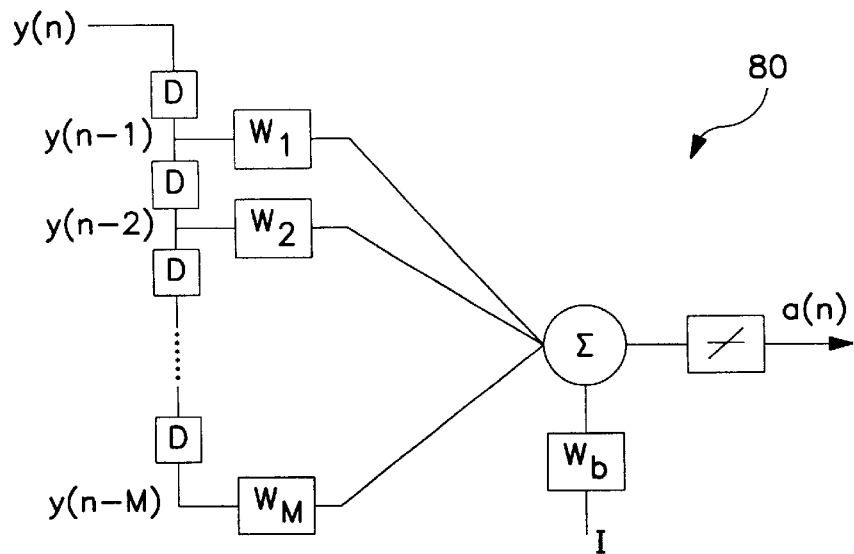
FIG. 4 illustrates a linear non-recurrent network.
Figure 5:
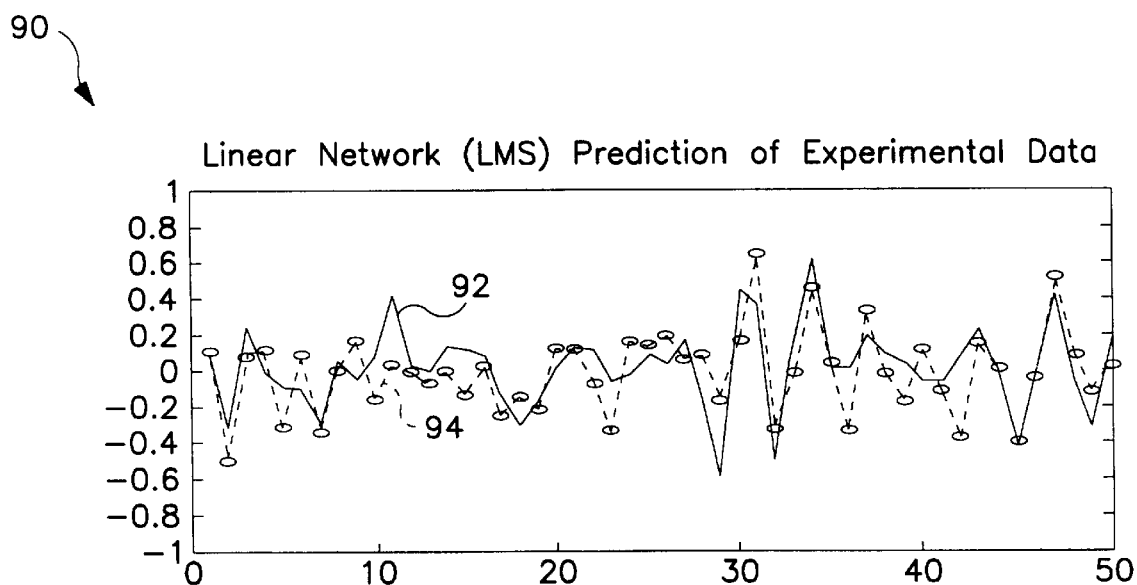
FIG. 5 illustrates the prediction results of the network of FIG. 4.

Several different network structures can also be used in the present invention. The more complicated network structures which are nonlinear or recurrent or both will provide improved performance over the simple linear non-recurrent. In order to illustrate the enhanced capabilities of the more complicated networks, four different network structures have been used to predict one step in advance, some experimental data. FIG. 4 and FIG. 5 illustrate a simple linear, non-recurrent, structure 80. It is a single layer network containing no feedback and utilizes a linear activation function to minimize the square of the error function. The test results 90 show both the actual contaminated signal 92 as well as the predicted signal 94 as determined by the network 80. The sum of the prediction errors for that window of data yielded a value of 2.07.

The first type of nonlinear network, which was evaluated, has a non-recurrent two-layer structure, which contains a nonlinear log-sigmoid function of the form $$F(n)=1/(1+e^{-N})$$

Figure 6:
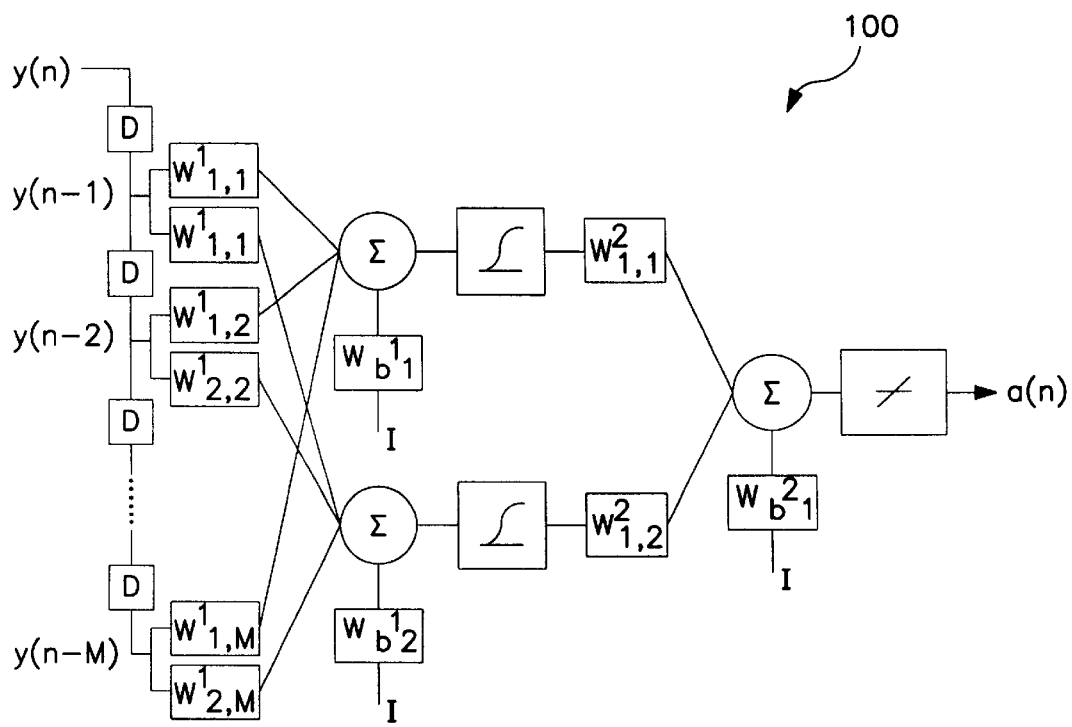
FIG. 6 and FIG. 7 show the network and the prediction results.
Figure 7:
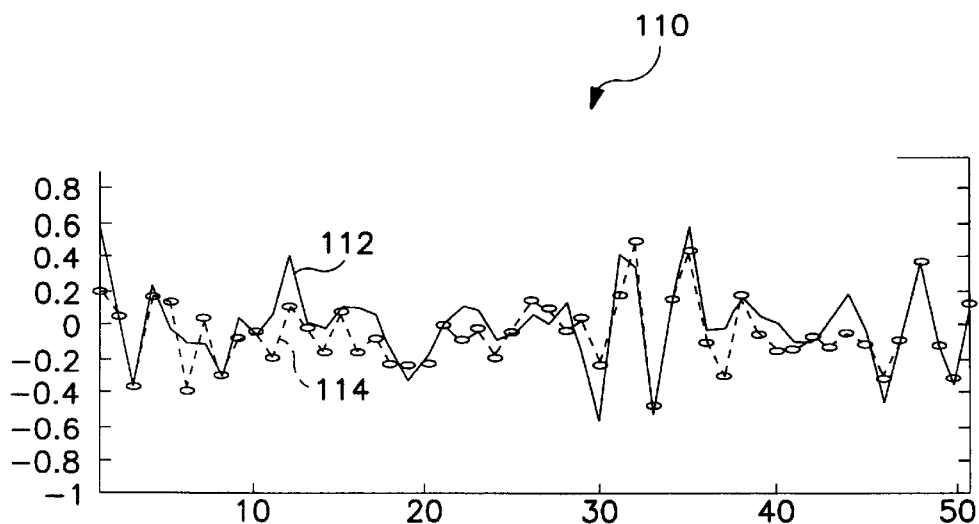

FIG. 6 and FIG. 7 show the network 100 and the prediction results 110. A fairly dramatic improvement in prediction accuracy can be seen with this network between the actual contaminated signal 112 and the predicted signal 114.

Figure 8:
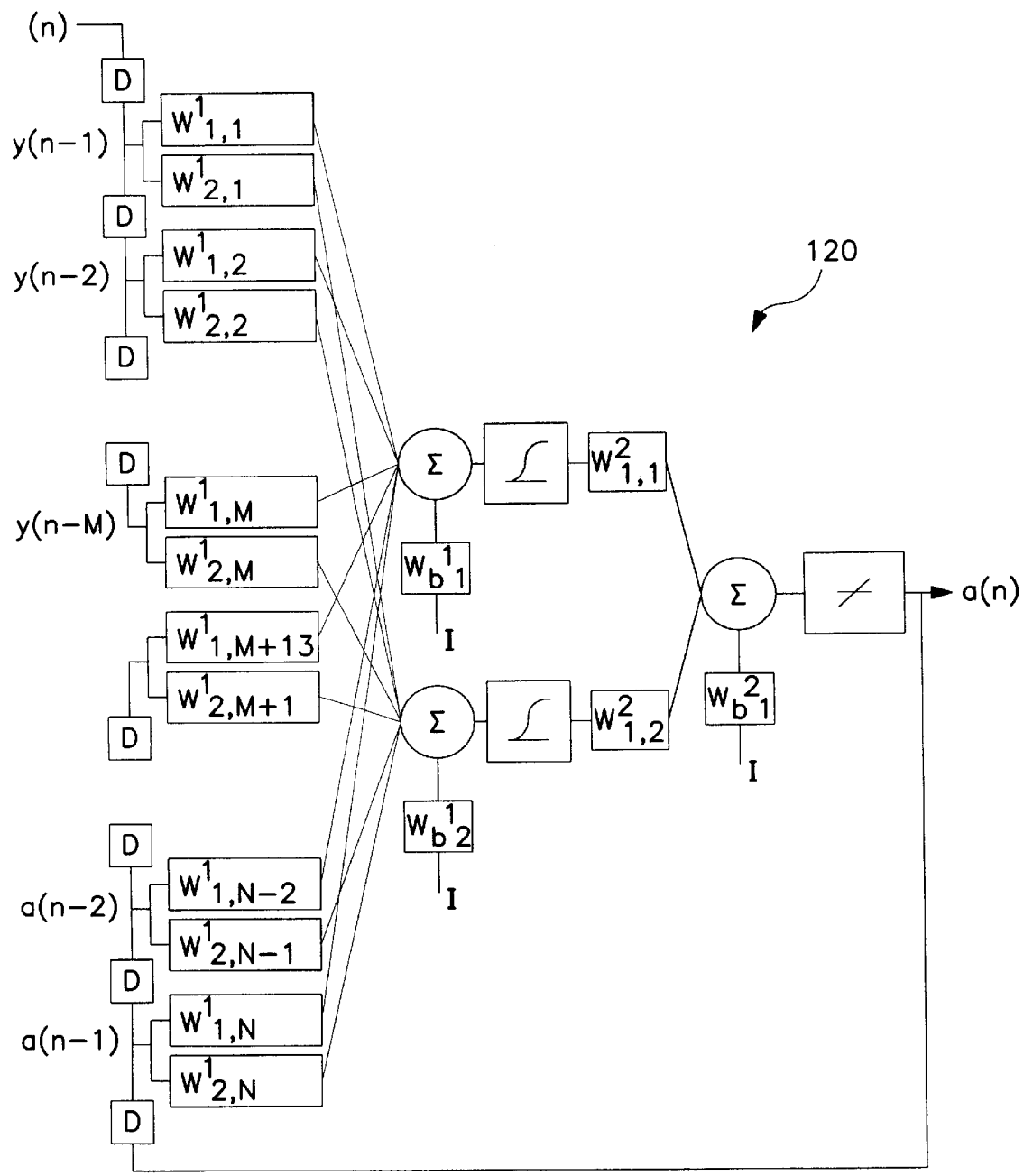
FIG. 8 and FIG. 9 illustrate a fully recurrent, nonlinear network and the prediction results.
Figure 9:
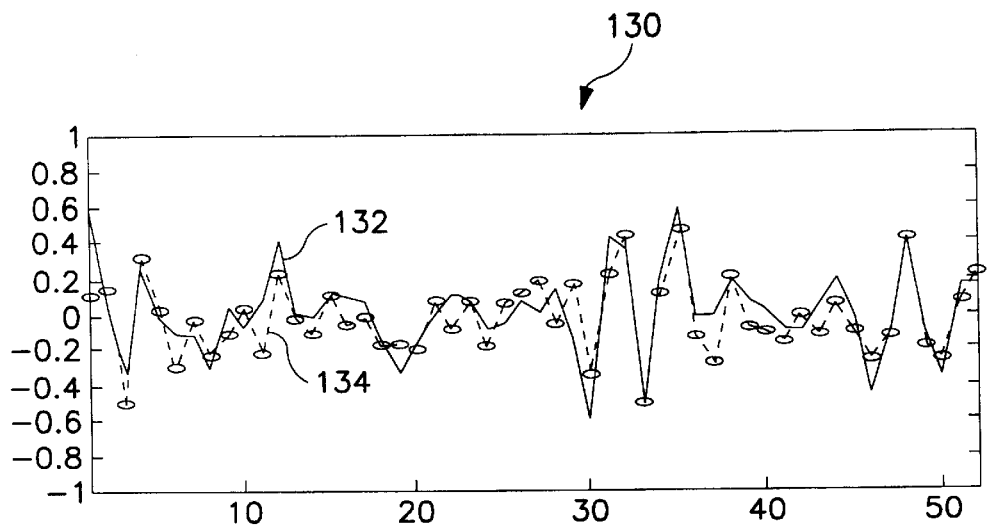

FIG. 8 and FIG. 9 show a fully recurrent, nonlinear network 120 and the prediction results 130. The nonlinear recurrent network shown in FIG. 8 is similar to the network of FIG. 6 with one key difference. A feedback loop is present which fills a tapped delay line with past network outputs, which are used as input to the network. This network is the most complicated to implement, but provides the best prediction performance. All networks utilized a 70-tap delay line for inputs, and the recurrent networks used a 10-tap delay for the recurrent inputs. The results shown in FIGS. 5, 7, and 9 indicate that using nonlinear prediction techniques provides better performance than conventional linear prediction techniques.

Figure 10:
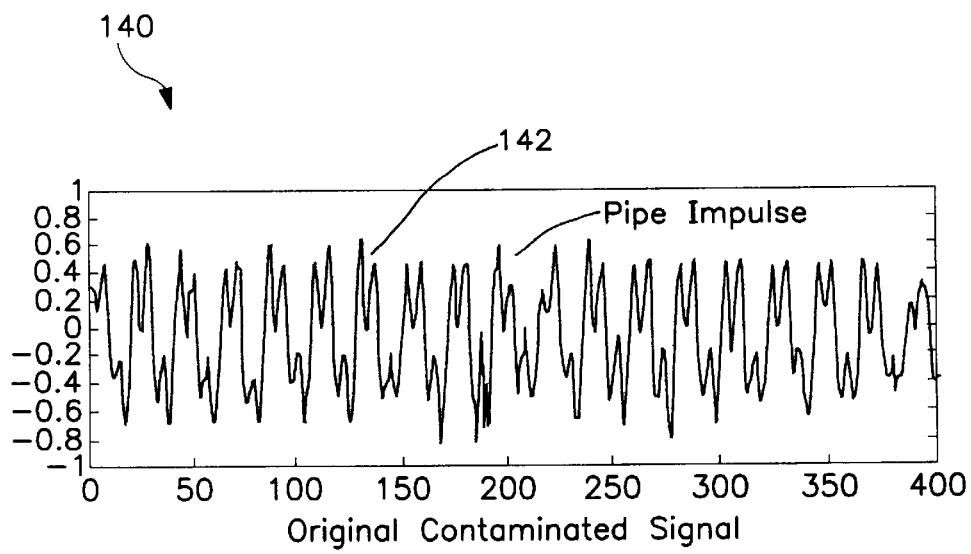
FIG. 10 illustrates an actual experimental result of adaptive filtering applied to a contaminated signal transmitted up a string of well pipe.
Figure 10:
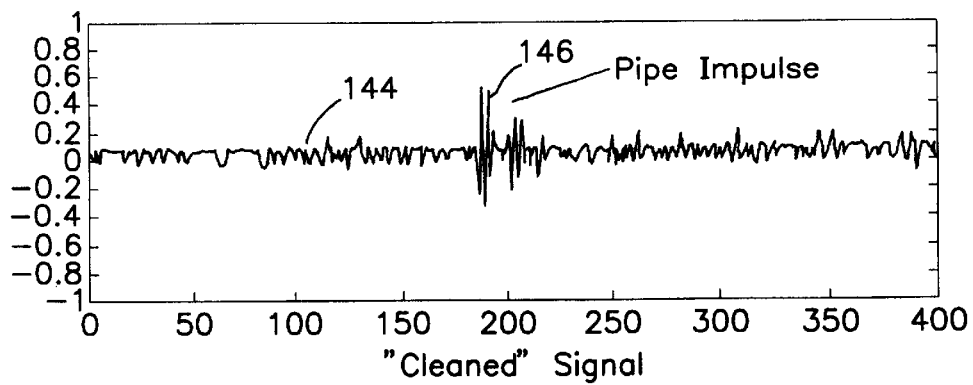

A real-time adaptive neural network-processing platform was implemented using a TMS320c32 digital signal processing (DSP) chip made by Texas Instruments. FIG. 10 illustrates the results 140 of an experiment wherein noise-contaminated accelerometer signals were detected in real-time using an adaptive neural network, which was programmed into the DSP. Accelerometers were attached to one end of a long pipe. A vibrational noise source was attached to the pipe as well, and then impulsive noise signals were introduced into the pipe. The adaptive filer was then used to process the noisy signals and recover the impulses. The pipe impulse signal 146 was easily noticed amid the reduced noise components 144.

In one embodiment of the invention, speech recognition algorithms can be used to analyze the cleaned signal 146 to look for specific event signals. Different tools make distinctive noises when actuated. The sounds can be stored a computer memory and compared with cleaned signals to give a readout of what downhole event occurred. Further, the cleaned output signal could be analyzed using deconvolution techniques, or others, to look for individual detonation events. This could be used to determine if all the charges in a perforation gun actually detonated. In other words, if six charges are located in the gun and only five peaks are detected, then the operator could assume that one charge did not detonate.

The embodiments shown and described above are only exemplary. Even though numerous characteristics and advantages of the present inventions have been set forth in the foregoing description, together with the details of the structure and function of the invention, the disclosure is illustrative only, and changes may be made in the detail, especially in the matters of shape, size, and arrangement of parts within the principles of the invention to the full extent indicated by the broad and general meaning of the terms used in the attached claims.

The restrictive description and drawings of the specific examples above do not point out what an infringement of this patent would be, but are to provide at least one explanation of how to make and use the inventions. The limit of the inventions and the bounds of the patent protection are measured by and defined in the following claims.

We claim:

1. A method of detecting an event signal at the surface from a noise contaminated signal from a downhole source, said method comprising the steps of:
   (a) detecting the noise contaminated signal with a detector;
   (b) filtering a substantial portion of the noise using an adaptive filter wherein said filtering is comprised of the following steps:
      (i) collecting a plurality of time-differentiated samples of the noise contaminated signal,
      (ii) analyzing said plurality of signal samples to generate a predictive sample signal,
      (iii) subtracting said predictive sample signal from a current sample of the noise contaminated signal; and
   (c) producing a cleaned output representation of the signal.

2. The method of claim 1 wherein step (b) further comprises filtering the noise with a non-recurrent network.

3. The method of claim 1 wherein step (b) further comprises filtering the noise with a recurrent network.

4. The method of claim 1 wherein step (a) comprises mounting the detector on a wellhead.

5. The method of claim 1 wherein step (a) further comprises detecting with an accelerometer.

6. The method of claim 1 wherein step (a) further comprises detecting with a hydrophone.

7. The method of claim 1 wherein step (a) further comprises detecting with a geophone.

8. The method of claim 1 wherein step (a) further comprises detecting with a pressure sensor.

9. The method of claim 1 wherein step (a) further comprises detecting with an antenna.

10. The method of claim 1 wherein step (a) further comprises detecting with a transducer.

11. The method of claim 1 wherein step (b) further comprises sub-step (iv) calculating an error function.

12. The method of claim 11 wherein step (b) further comprises sub-step (v) adjusting a filtering weight applied to subsequent signal samples to minimize the value of the error function squared.

13. The method of claim 12 wherein step (b) sub-step (v) further comprises applying a linear regression algorithm to adjust the filtering weight.

14. The method of claim 12 wherein step (b) sub-step (v) further comprises applying a non-linear linear regression algorithm to adjust the filtering weight.

15. The method of claim 1 further comprises outputting the cleaned output representation to a memory.

16. The method of claim 1 further comprises outputting the cleaned output representation to a monitor.

17. The method of claim 1 further comprises outputting the cleaned output representation to a strip chart recorder.

18. The method of claim 1 further comprises outputting the cleaned output representation to an audio speaker.

19. The method of claim 1 further comprises applying a recognition algorithm to the cleaned output representation.

20. An apparatus for detecting an event signal at the surface from a noise contaminated signal from a downhole source, said apparatus comprising:
   (a) a detector for detecting the noise contaminated signal located in proximity to a wellhead, wherein said detector has an output;
   (b) adaptive filter means coupled to said detector output for filtering a substantial portion of the noise, wherein said filter means is comprised of:
      (i) means for collecting a plurality of time-differentiated samples of the noise contaminated signal,
      (ii) means for analyzing said plurality of signal samples,
      (iii) means to generate a predictive sample signal from analysis of said plurality of signal samples,
      (iv) means for subtracting said predictive sample signal from a current sample of the noise contaminated signal; and
   (c) output means for displaying a cleaned output representation of the signal.

21. The apparatus of claim 20 wherein the adaptive filter means further comprises a non-recurrent network.

22. The apparatus of claim 20 wherein the adaptive filter means further comprises a recurrent network.

23. The apparatus of claim 20 wherein the detector comprises an accelerometer.

24. The apparatus of claim 20 wherein the detector comprises a hydrophone.

25. The apparatus of claim 20 wherein the detector comprises a geophone.

26. The apparatus of claim 20 wherein the detector comprises a pressure sensor.

27. The apparatus of claim 20 wherein the detector comprises an antenna.

28. The apparatus of claim 20 wherein the detector comprises a transducer.

29. The apparatus of claim 20 wherein said output means comprises a memory.

30. The apparatus of claim 20 wherein said output means comprises a monitor.

31. The apparatus of claim 20 wherein said output means comprises a strip chart recorder.

32. The apparatus of claim 20 wherein said output means comprises an audio speaker.

* * * * *